US008626837B2

(12) United States Patent
Fisher et al.

(10) Patent No.: US 8,626,837 B2
(45) Date of Patent: Jan. 7, 2014

(54) IDENTITY MANAGEMENT FOR OPEN OVERLAY FOR SOCIAL NETWORKS AND ONLINE SERVICES

(75) Inventors: Donald Fisher, Westford, MA (US);
Havoc Penington, Westford, MA (US);
Bryan Clark, Westford, MA (US);
Owen Taylor, Westford, MA (US);
Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 32 days.

(21) Appl. No.: 13/481,633

(22) Filed: May 25, 2012

(65) Prior Publication Data

US 2012/0233263 A1    Sep. 13, 2012

Related U.S. Application Data

(62) Division of application No. 12/847,983, filed on Jul. 30, 2010, now Pat. No. 8,191,000, which is a division of application No. 11/443,060, filed on May 31, 2006, now Pat. No. 7,792,903.

(51) Int. Cl.
*G06F 15/16* (2006.01)

(52) U.S. Cl.
USPC .......................................... 709/204

(58) Field of Classification Search
USPC .................................. 709/203, 204
See application file for complete search history.

(56) References Cited

U.S. PATENT DOCUMENTS

| 6,018,768 | A | 1/2000 | Ullman et al. |
| 6,020,884 | A | 2/2000 | MacNaughton et al. |
| 6,317,784 | B1 | 11/2001 | Mackintosh et al. |
| 6,519,648 | B1 | 2/2003 | Eyal |
| 6,526,411 | B1 | 2/2003 | Ward |
| 6,553,180 | B1 | 4/2003 | Kikuchi et al. |
| 6,714,722 | B1 | 3/2004 | Tsukidate |
| 6,721,489 | B1 | 4/2004 | Benjamin et al. |
| 6,763,345 | B1 | 7/2004 | Hempleman et al. |
| 6,853,982 | B2 | 2/2005 | Smith et al. |
| 6,957,398 | B1 | 10/2005 | Nayeri |
| 7,069,308 | B2 | 6/2006 | Abrams |
| 7,093,020 | B1 | 8/2006 | McCarty et al. |
| 7,120,928 | B2 | 10/2006 | Sheth et al. |
| 7,181,441 | B2 | 2/2007 | Mandato et al. |
| 7,234,117 | B2 | 6/2007 | Zaner et al. |
| 7,345,232 | B2 | 3/2008 | Toivonen et al. |
| 7,426,537 | B2 | 9/2008 | Lee et al. |
| 7,487,214 | B2 | 2/2009 | Qureshi et al. |
| 7,613,769 | B1 * | 11/2009 | Hess ............................ 709/203 |
| 7,680,770 | B1 | 3/2010 | Buyukkokten et al. |
| 7,684,815 | B2 | 3/2010 | Counts et al. |

(Continued)

OTHER PUBLICATIONS

Office Action for U.S. Appl. No. 11/443,060, mailed Jun. 17, 2009.
Final Office Action for U.S. Appl. No. 11/443,060, mailed Feb. 2, 2010.
Office Action for U.S. Appl. No. 12/847,983, mailed Nov. 23, 2011.
Office Action for U.S. Appl. No. 11/443,112, mailed Oct. 8, 2008.

(Continued)

*Primary Examiner* — Krisna Lim
(74) *Attorney, Agent, or Firm* — Lowenstein Sandler LLP

(57) ABSTRACT

Methods and systems to manage users of a social network. The method includes receiving, at a server, a request to contact a user from another user of a social network based on a selected one of a plurality of associated identity resources of the user known by other users. The method also includes restricting views of other users for the identity of the user to the selected one of the plurality of associated identity resources.

20 Claims, 14 Drawing Sheets

(56) References Cited

U.S. PATENT DOCUMENTS

| | | | |
|---|---|---|---|
| 7,698,301 B2 | 4/2010 | Lourdeaux | |
| 7,730,216 B1 | 6/2010 | Issa et al. | |
| 7,797,446 B2 | 9/2010 | Heller et al. | |
| 7,885,901 B2 | 2/2011 | Hull et al. | |
| 7,886,010 B1 | 2/2011 | Shankar | |
| 7,904,511 B2* | 3/2011 | Ryan et al. | 709/204 |
| 7,985,911 B2 | 7/2011 | Oppenheimer | |
| 8,010,458 B2* | 8/2011 | Galbreath et al. | 705/319 |
| 8,019,875 B1* | 9/2011 | Nielsen | 709/227 |
| 2002/0016960 A1 | 2/2002 | Yamato et al. | |
| 2002/0042915 A1 | 4/2002 | Kubischta et al. | |
| 2002/0087797 A1 | 7/2002 | Adrangi | |
| 2002/0120925 A1 | 8/2002 | Logan | |
| 2002/0154162 A1 | 10/2002 | Bhatia et al. | |
| 2002/0156852 A1 | 10/2002 | Hughes et al. | |
| 2002/0188947 A1 | 12/2002 | Wang et al. | |
| 2002/0194226 A1 | 12/2002 | Sheth et al. | |
| 2002/0194502 A1 | 12/2002 | Sheth et al. | |
| 2002/0194598 A1 | 12/2002 | Connelly | |
| 2003/0014419 A1 | 1/2003 | Clapper | |
| 2003/0028595 A1 | 2/2003 | Vogt et al. | |
| 2003/0028892 A1 | 2/2003 | Gewickey et al. | |
| 2003/0050976 A1 | 3/2003 | Block et al. | |
| 2003/0093790 A1 | 5/2003 | Logan et al. | |
| 2003/0115274 A1 | 6/2003 | Weber | |
| 2003/0115585 A1 | 6/2003 | Barsness et al. | |
| 2003/0135513 A1 | 7/2003 | Quinn et al. | |
| 2003/0182315 A1 | 9/2003 | Plastina et al. | |
| 2003/0233650 A1 | 12/2003 | Zaner et al. | |
| 2004/0041836 A1 | 3/2004 | Zaner et al. | |
| 2004/0078825 A1 | 4/2004 | Murphy | |
| 2004/0083273 A1 | 4/2004 | Madison et al. | |
| 2004/0122959 A1 | 6/2004 | Lortz | |
| 2004/0128624 A1 | 7/2004 | Arellano et al. | |
| 2004/0249658 A1 | 12/2004 | Schwerin-Wenzel et al. | |
| 2005/0004985 A1 | 1/2005 | Stochosky | |
| 2005/0022251 A1 | 1/2005 | Ohnuma et al. | |
| 2005/0038819 A1 | 2/2005 | Hicken et al. | |
| 2005/0097173 A1 | 5/2005 | Johns et al. | |
| 2005/0114340 A1 | 5/2005 | Huslak et al. | |
| 2005/0114527 A1 | 5/2005 | Hankey et al. | |
| 2005/0132401 A1 | 6/2005 | Boccon-Gibod et al. | |
| 2005/0138659 A1 | 6/2005 | Boccon-Gibod et al. | |
| 2005/0171799 A1 | 8/2005 | Hull et al. | |
| 2005/0172001 A1 | 8/2005 | Zaner et al. | |
| 2005/0193054 A1 | 9/2005 | Wilson et al. | |
| 2005/0210285 A1 | 9/2005 | Williams | |
| 2005/0216300 A1* | 9/2005 | Appelman et al. | 705/1 |
| 2005/0216550 A1* | 9/2005 | Paseman et al. | 709/202 |
| 2005/0240671 A1 | 10/2005 | Beyer et al. | |
| 2005/0251411 A1 | 11/2005 | Ishii et al. | |
| 2005/0267766 A1* | 12/2005 | Galbreath et al. | 705/1 |
| 2005/0278377 A1 | 12/2005 | Mirrashidi et al. | |
| 2006/0004590 A1 | 1/2006 | Khoo | |
| 2006/0004623 A1 | 1/2006 | Jasti | |
| 2006/0020614 A1 | 1/2006 | Kolawa et al. | |
| 2006/0026593 A1 | 2/2006 | Canning et al. | |
| 2006/0041902 A1 | 2/2006 | Zigmond | |
| 2006/0048059 A1 | 3/2006 | Etkin | |
| 2006/0080613 A1 | 4/2006 | Savant | |
| 2006/0101119 A1 | 5/2006 | Qureshi et al. | |
| 2006/0117378 A1 | 6/2006 | Tam et al. | |
| 2006/0129828 A1 | 6/2006 | Shi | |
| 2006/0143183 A1 | 6/2006 | Goldberg et al. | |
| 2006/0143236 A1 | 6/2006 | Wu | |
| 2006/0184997 A1 | 8/2006 | La Rotonda et al. | |
| 2006/0190824 A1 | 8/2006 | Montulli et al. | |
| 2006/0195462 A1 | 8/2006 | Rogers | |
| 2006/0195479 A1 | 8/2006 | Spiegelman et al. | |
| 2006/0195516 A1 | 8/2006 | Beaupre | |
| 2006/0195525 A1 | 8/2006 | Page et al. | |
| 2006/0195532 A1 | 8/2006 | Zlateff et al. | |
| 2006/0212906 A1 | 9/2006 | Cantalini | |
| 2006/0230061 A1 | 10/2006 | Sample et al. | |
| 2006/0239131 A1 | 10/2006 | Nathan et al. | |
| 2006/0242232 A1 | 10/2006 | Murillo et al. | |
| 2006/0242234 A1 | 10/2006 | Counts et al. | |
| 2006/0242554 A1 | 10/2006 | Gerace et al. | |
| 2006/0253584 A1 | 11/2006 | Dixon et al. | |
| 2006/0277455 A1 | 12/2006 | Yamada et al. | |
| 2006/0288041 A1 | 12/2006 | Plastina et al. | |
| 2007/0005754 A1 | 1/2007 | Horvitz et al. | |
| 2007/0018394 A1 | 1/2007 | Montaldo et al. | |
| 2007/0078993 A1 | 4/2007 | Issa | |
| 2007/0083894 A1 | 4/2007 | Gonsalves et al. | |
| 2007/0094247 A1 | 4/2007 | Chowdhurty et al. | |
| 2007/0106627 A1 | 5/2007 | Srivastava et al. | |
| 2007/0106672 A1 | 5/2007 | Sighart et al. | |
| 2007/0146820 A1 | 6/2007 | Asazu et al. | |
| 2007/0157105 A1 | 7/2007 | Owens et al. | |
| 2007/0161382 A1 | 7/2007 | Melinger et al. | |
| 2007/0162432 A1 | 7/2007 | Armstrong et al. | |
| 2007/0168543 A1 | 7/2007 | Krikorian et al. | |
| 2007/0169165 A1 | 7/2007 | Crull et al. | |
| 2007/0174389 A1 | 7/2007 | Armstrong et al. | |
| 2007/0192299 A1 | 8/2007 | Zuckerberg et al. | |
| 2007/0220054 A1 | 9/2007 | Barton et al. | |
| 2007/0220090 A1 | 9/2007 | Hall | |
| 2007/0220092 A1 | 9/2007 | Heitzeberg et al. | |
| 2007/0255785 A1 | 11/2007 | Hayashi et al. | |
| 2007/0255831 A1 | 11/2007 | Hayashi et al. | |
| 2007/0266401 A1 | 11/2007 | Hallberg | |
| 2007/0277110 A1 | 11/2007 | Rogers et al. | |
| 2007/0282730 A1 | 12/2007 | Carpenter et al. | |
| 2007/0282877 A1 | 12/2007 | Fischer et al. | |
| 2007/0282949 A1 | 12/2007 | Fischer et al. | |
| 2007/0282959 A1 | 12/2007 | Stern | |
| 2007/0282980 A1 | 12/2007 | Fischer | |
| 2007/0288465 A1 | 12/2007 | Aggarwal et al. | |
| 2008/0010372 A1 | 1/2008 | Khedouri et al. | |
| 2008/0040474 A1 | 2/2008 | Zuckerberg et al. | |
| 2008/0052371 A1 | 2/2008 | Partovi et al. | |
| 2008/0065604 A1 | 3/2008 | Tiu et al. | |
| 2008/0092054 A1 | 4/2008 | Bhumkar et al. | |
| 2008/0092168 A1 | 4/2008 | Logan et al. | |
| 2008/0092182 A1 | 4/2008 | Conant | |
| 2008/0104521 A1 | 5/2008 | Dubinko et al. | |
| 2008/0133475 A1 | 6/2008 | Fischer | |
| 2008/0133520 A1 | 6/2008 | Hempleman et al. | |
| 2008/0133593 A1 | 6/2008 | Clark | |
| 2008/0133638 A1 | 6/2008 | Fischer et al. | |
| 2008/0133649 A1 | 6/2008 | Pennington et al. | |
| 2008/0133658 A1 | 6/2008 | Pennington | |
| 2008/0133696 A1 | 6/2008 | Hanebeck | |
| 2008/0133737 A1 | 6/2008 | Fischer et al. | |
| 2008/0133763 A1 | 6/2008 | Clark et al. | |
| 2008/0134039 A1 | 6/2008 | Fischer et al. | |
| 2008/0134053 A1 | 6/2008 | Fischer | |
| 2008/0134054 A1 | 6/2008 | Clark et al. | |
| 2008/0201376 A1 | 8/2008 | Kehdouri et al. | |
| 2008/0320139 A1 | 12/2008 | Fukuda et al. | |
| 2009/0157693 A1 | 6/2009 | Palahnuk | |
| 2009/0254615 A1 | 10/2009 | Baliga et al. | |
| 2010/0070917 A1 | 3/2010 | Gates et al. | |
| 2010/0077029 A1 | 3/2010 | Shook et al. | |
| 2010/0162324 A1 | 6/2010 | Mehta et al. | |
| 2010/0241580 A1 | 9/2010 | Schleier-Smith | |
| 2010/0333019 A1 | 12/2010 | Oschwald et al. | |
| 2011/0258013 A1 | 10/2011 | Groves | |

OTHER PUBLICATIONS

Office Action for U.S. Appl. No. 11/443,112, mailed Oct. 20, 2009.
Final Office Action for U.S. Appl. No. 11/443,112, mailed Mar. 23, 2009.
Advisory Action for U.S. Appl. No. 11/443,112, mailed Jul. 17, 2009.
Final Office Action for U.S. Appl. No. 11/443,112, mailed Apr. 16, 2010.
Advisory Action for U.S. Appl. No. 11/443,112, mailed Jun. 4, 2010.
Office Action for U.S. Appl. No. 11/443,112, mailed Oct. 1, 2010.
Final Office Action for U.S. Appl. No. 11/443,112, mailed Feb. 17, 2011.
Advisory Action for U.S. Appl. No. 11/443,112, mailed Apr. 22, 2011.

(56) References Cited

OTHER PUBLICATIONS

Office Action for U.S. Appl. No. 11/443,112, mailed Oct. 5, 2011.
Final Office Action for U.S. Appl. No. 11/443,112, mailed Jun. 28, 2012.
Advisory Action for U.S. Appl. No. 11/443,112, mailed Aug. 31, 2012.
Office Action for U.S. Appl. No. 11/443,112, mailed Oct. 10, 2012.
Final Office Action for U.S. Appl. No. 11/443,112, mailed Apr. 25, 2013.
Advisory Action for U.S. Appl. No. 11/443,112, mailed Jun. 28, 2013.
Office Action for U.S. Appl. No. 11/443,089, mailed Mar. 31, 2009.
Final Office Action for U.S. Appl. No. 11/443,089, mailed Oct. 16, 2009.
Advisory Action for U.S. Appl. No. 11/443,089, mailed Mar. 26, 2010.
Office Action for U.S. Appl. No. 11/443,089, mailed Aug. 26, 2010.
Final Office Action for U.S. Appl. No. 11/443,089, mailed Dec. 30, 2010.
Advisory Action for U.S. Appl. No. 11/443,089, mailed Mar. 9, 2011.
Office Action for U.S. Appl. No. 11/443,089, mailed Jun. 16, 2011.
Office Action for U.S. Appl. No. 11/443,061, mailed Sep. 30, 2009.
Office Action for U.S. Appl. No. 11/443,061, mailed Jun. 24, 2010.
Final Office Action for U.S. Appl. No. 11/443,061, mailed Feb. 9, 2011.
Advisory Action for U.S. Appl. No. 11/443,061, mailed Apr. 29, 2011.
Office Action for U.S. Appl. No. 11/443,061, mailed Jul. 11, 2011.
Final Office Action for U.S. Appl. No. 11/443,061, mailed Dec. 29, 2011.
Advisory Action for U.S. Appl. No. 11/443,061, mailed Mar. 13, 2012.
Red Hat, Inc. Office Action for U.S. Appl. No. 11/443,083, mailed Sep. 3, 2008.
Red Hat, Inc. Final Office Action for U.S. Appl. No. 11/443,083, mailed Jan. 16, 2009.
Red Hat, Inc. Advisory Action for U.S. Appl. No. 11/443,083, mailed Mar. 25, 2009.
Red Hat, Inc. Office Action for U.S. Appl. No. 11/443,083, mailed Jun. 5, 2009.
Red Hat, Inc. Final Office Action for U.S. Appl. No. 11/443,083, mailed Jan. 6, 2010.
Red Hat, Inc. Advisory Action for U.S. Appl. No. 11/443,083, mailed Apr. 12, 2010.
Red Hat, Inc. Office Action for U.S. Appl. No. 11/443,083, mailed Nov. 24, 2010.
Red Hat, Inc. Final Office Action for U.S. Appl. No. 11/443,083, mailed Apr. 11, 2011.
Red Hat, Inc. Advisory Action for U.S. Appl. No. 11/443,083, mailed Jun. 30, 2011.
Red Hat, Inc. Office Action for U.S. Appl. No. 11/443,083, mailed Aug. 24, 2011.
Final Office Action for U.S. Appl. No. 11/443,083, mailed Jan. 12, 2012.
Advisory Action for U.S. Appl. No. 11/443,083, mailed Mar. 21, 2012.
Office Action for U.S. Appl. No. 11/443,055, mailed Apr. 29, 2009.
Office Action for U.S. Appl. No. 11/443,055, mailed Dec. 9, 2009.
Final Office Action for U.S. Appl. No. 11/443,055, mailed Jul. 19, 2010.
Advsiory Action for U.S. Appl. No. 11/443,055, mailed Sep. 22, 2010.
Office Action for U.S. Appl. No. 11/443,055, mailed Mar. 28, 2011.
Final Office Action for U.S. Appl. No. 11/443,055, mailed Aug. 17, 2011.
Advsiory Action for U.S. Appl. No. 11/443,055, mailed Oct. 25, 2011.
Office Action for U.S. Appl. No. 11/565,046, mailed Mar. 23, 2009.
Final Office Action for U.S.Appl. No. 11/565,046, mailed Nov. 19, 2009.
Advsiory Action for U.S. Appl. No. 11/565,046, mailed Apr. 6, 2010.
Office Action for U.S. Appl. No. 11/565,046, mailed Jul. 27, 2010.
US 2009/0139374 A1, 01/2009, Logan et al. (withdrawn)

* cited by examiner

FIG. 4

HELLO my name is MUGSHOT

Name tags don't tell people what you're about. Show the world what you're sharing, listening to, and watching. Let them know the real you.

Admit it, you share links and listen to tunes at work or school. Real multi-taskers also watch TV. Use that anti-productiveness more productively. Display your music playlist as a mood flag. Discuss sites and shows with friends you can't meet at the water cooler. See what other people are doing when they should be working. Sign up or Log in to Mugshot and get busy!

LINK SWARM — MORE

Guy in Malaysia gets $218 trillion dollar phone bill
It wasn't clear whether the bill was just a mistake, or if his father's phone line was used illegally after his death.
sent by Samiam — 141 views | 5 quips

3D chocolate printer made from LEGO
Using lego and a few custom components a 3D printer for chocolate is possible.
sent by BlueZakoo — 93 views | 8 quips

NASA will crash a spacecraft into the moon in 2008
You'll be able to see the explosion from Earth. Cooooool.
sent by repete — 77 views | 21 quips

MUSIC RADAR — MORE

Samiam is playing
Prep Gwarlek 38 Remix
by Alarm Will Sound
Play at iTunes

Hugmenot is playing
Meet Me At The Club House
by Quintron
Play at iTunes

LilBigFat is playing
No Rest For The Obsessed
by Lightning Bold
Play at iTunes

TV PARTY — MORE

Wife Swap
starts in 22 mins
"West/Grimes" A mom who requires squeaky-clean excellence from her family swaps places with an easygoing ...
14 people talking about this show

Prison Break
starts in 22 mins
"J Cat" As Michael struggles to remember missing pieces of the prison schematics, guards place him in solitary for refusing ...
8 people talking about this show

24
starts in 1 hour, 22 mins
"Day 5: 11:00PM - 12:00 Midnight" New discoveries regarding the day's horrific events keep agent Jack Bauer away ...
37 people talking about this show

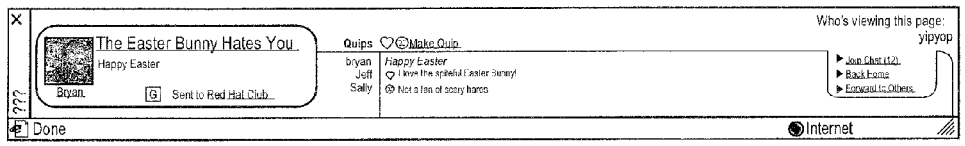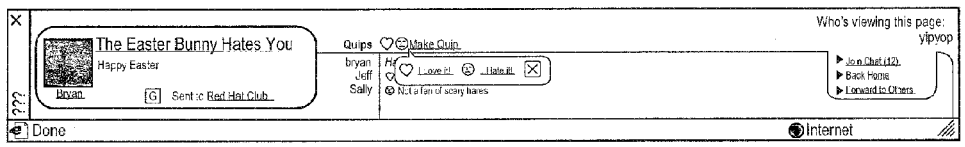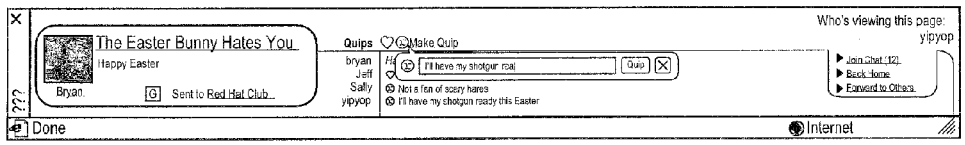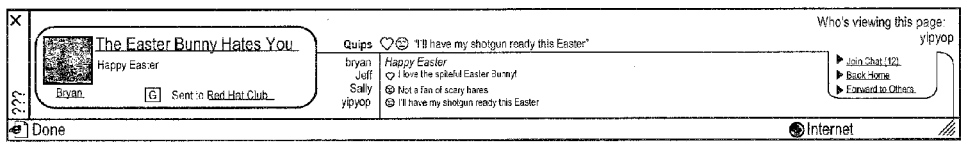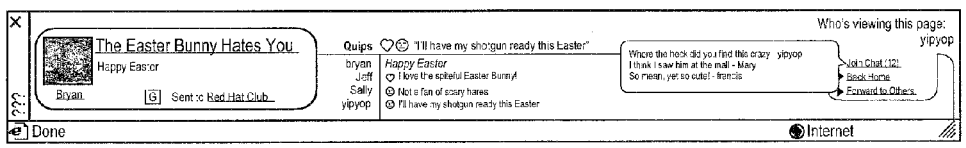
FIG. 13

IDENTITY MANAGEMENT FOR OPEN OVERLAY FOR SOCIAL NETWORKS AND ONLINE SERVICES

CROSS-REFERENCE TO RELATED APPLICATION

This application is a division of application Ser. No. 12/847,983, filed Jul. 30, 2010, now U.S. Pat. No. 8,191,000, which is a division of application Ser. No. 11/443,060, filed May 31, 2006, now U.S. Pat. No. 7,792,903, which is incorporated, in its entirety, herein by reference.

FIELD OF THE INVENTION

The present invention relates to online services and communications tools and, more particularly, to identity management in social networks.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

Unfortunately, it can be difficult for users to maintain their multiplicity of accounts for their social networks. For example, users can have multiple profiles at multiple sites for their music, email, instant messaging, etc. However, most users eventually do not keep up with all of their accounts. For example, many users have four or five e-mail addresses, but essentially may use only one or two of them.

In addition, the Internet is crowded with a large number of social networking sites and sharing tools. For example, the recent supremacy of iTunes has triggered a plethora of music service offerings. As another example, the recent success of YouTube and Google Video has sparked an explosion of video-sharing sites.

Unfortunately, due to their current business model, the known social network sites are vulnerable to spammers and other forms of fraud. Thus, many closed social networking sites will likely become abandoned or a major hassle for users to maintain.

Accordingly, it may be desirable to provide methods and systems that serve as an open platform for users to maintain their personas across a plurality of social networking sites and online services. It may also be desirable to provide methods and systems that serve as an open overlay that serves as a consistent context by which users interact with social networking sites and online services.

SUMMARY OF THE INVENTION

In accordance with one feature of the present invention, a method of forming a social network of users is provided. It is determined when a user has invited a new user to join the social network. A temporary group is formed that includes the new user in response to the invitation. Information is provided to the temporary group that indicates existing groups of the social network. An existing group is selected based on input received from the new user. Information is then distributed about the new user among users of the existing group selected by the new user.

In accordance with another feature of the present invention, a method of forming a social network of users is provided. Multiple invitations to a new user are identified. The new user is assigned a temporary identity. The temporary identity for the new user is distributed until the new user completes registration into the social network. All inviters of the new user are notified when the new user completes registration. The temporary identity is then converted into a permanent identity when the new user completes registration into the social network.

In accordance with another feature of the present invention, a method of viewing a user's identity in a social network is provided. The user has a plurality of associated identity resources known by only some of the other users in the social network. A request is received from another user to contact the user based on one of associated identity resources of the user. Views of the other user are restricted for the identity of the user to the associated identity resource used by that other user.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 4 illustrates an exemplary home page that may be provided by the open overlay service in accordance with the principles of the present invention;

FIG. 8 illustrates an exemplary group list page that may be provided by the open overlay service;

FIG. 9 illustrates an exemplary invitation form that may be provided by the open overlay service;

FIG. 10 illustrates another exemplary groups list page that may be provided by the open overlay service;

FIG. 12 shows another example of indicating share activity on the group level of the open overlay service.

FIG. 13 shows an example of a link "swarm" as it may appear on a client; and

DESCRIPTION OF THE EMBODIMENTS

Embodiments of the present invention provide methods and systems for managing the multiple identities used by a user. The user's existing contact lists, website accounts, buddy lists, and the like are analyzed to determine the identities used by the user. A graph is then constructed in order to track and integrate the multiple identities of the user in a social network. The social network graph may then be used by a social network overlay so that the user can share information across their different identities with different users that only know some of the user's multiple identities.

Reference will now be made in detail to exemplary embodiments of the invention, which are illustrated in the accompanying drawings. Wherever possible, the same reference numbers will be used throughout the drawings to refer to the same or like parts.

Figure 1:
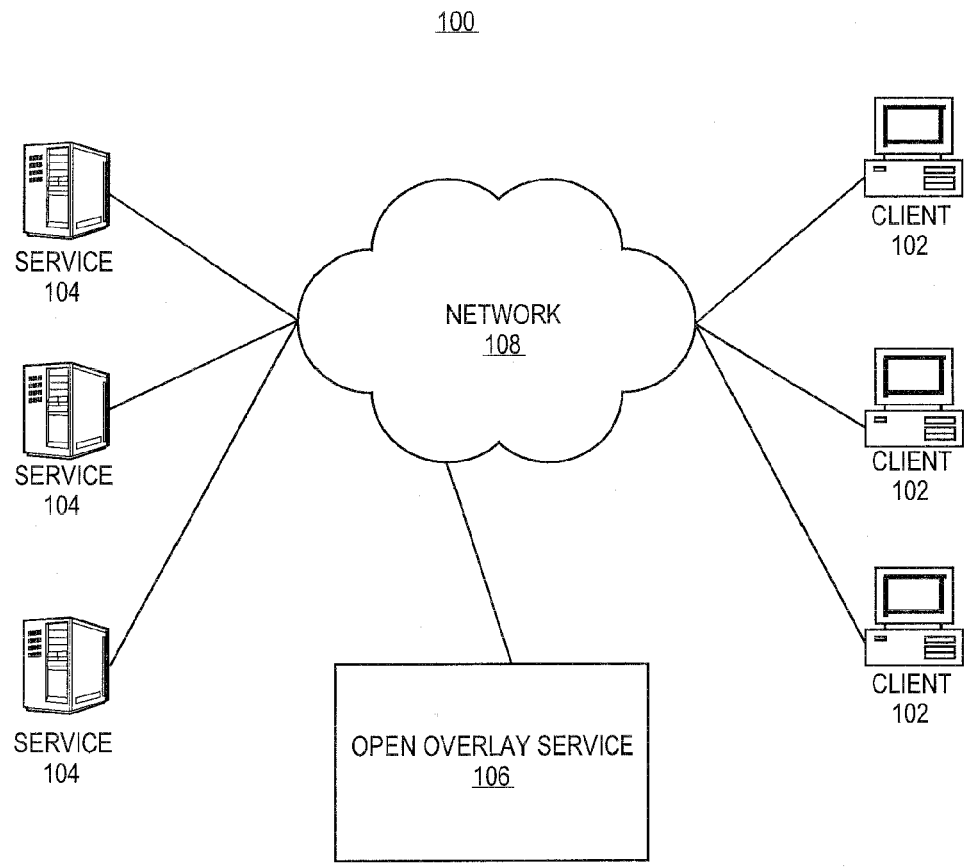
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
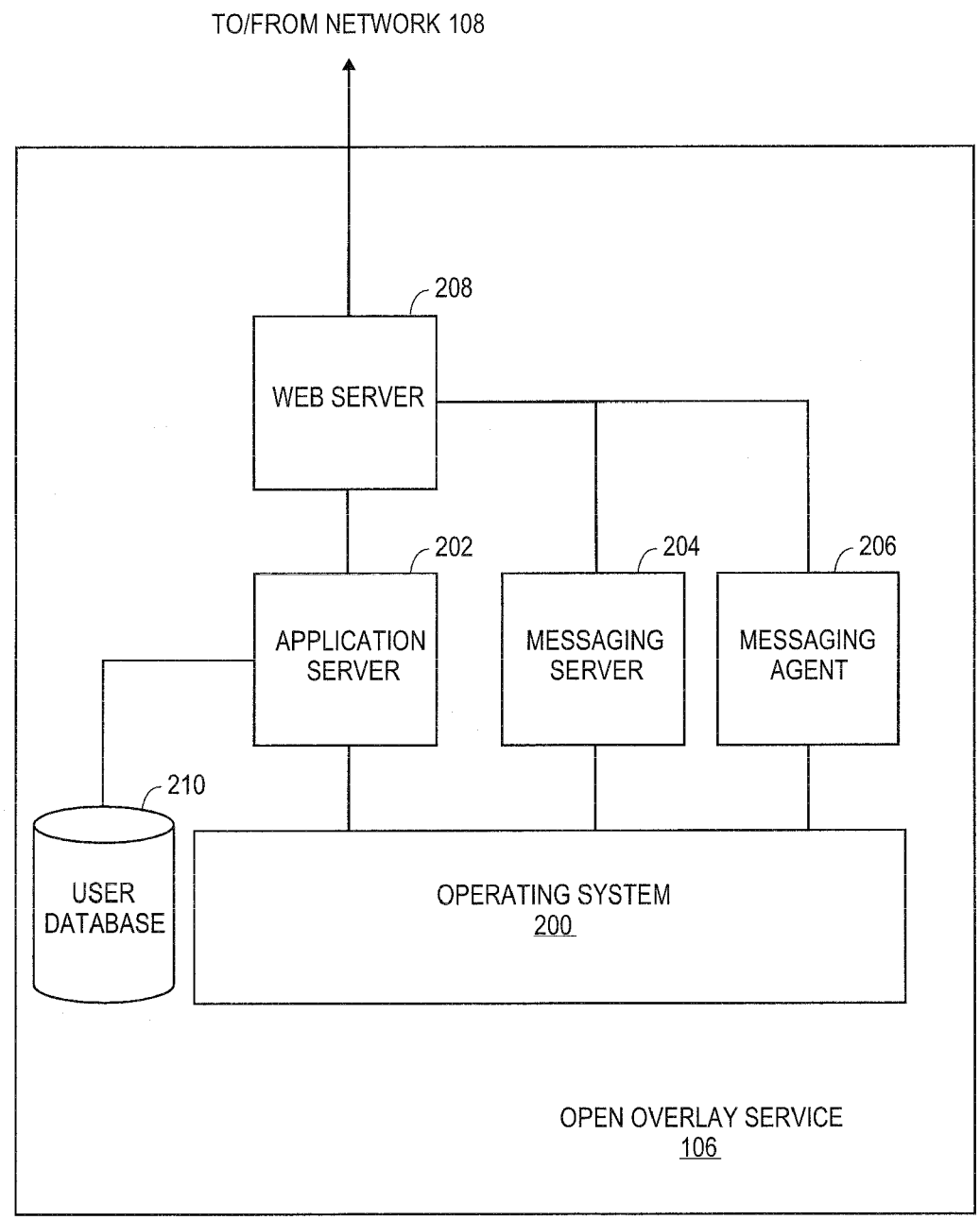
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier.

Application server 202 may then rely on the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both email addresses #1 and 2 can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 operates in conjunction with messaging server 204 to monitor the activity of clients 102. In particular, messaging agent 206 may be a relatively small and focused computer application (or "bot") that runs continuously, in the background simultaneously for each of clients 102, as other programs are being run, and responds automatically to a user's activity clients 102.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging agent 206. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
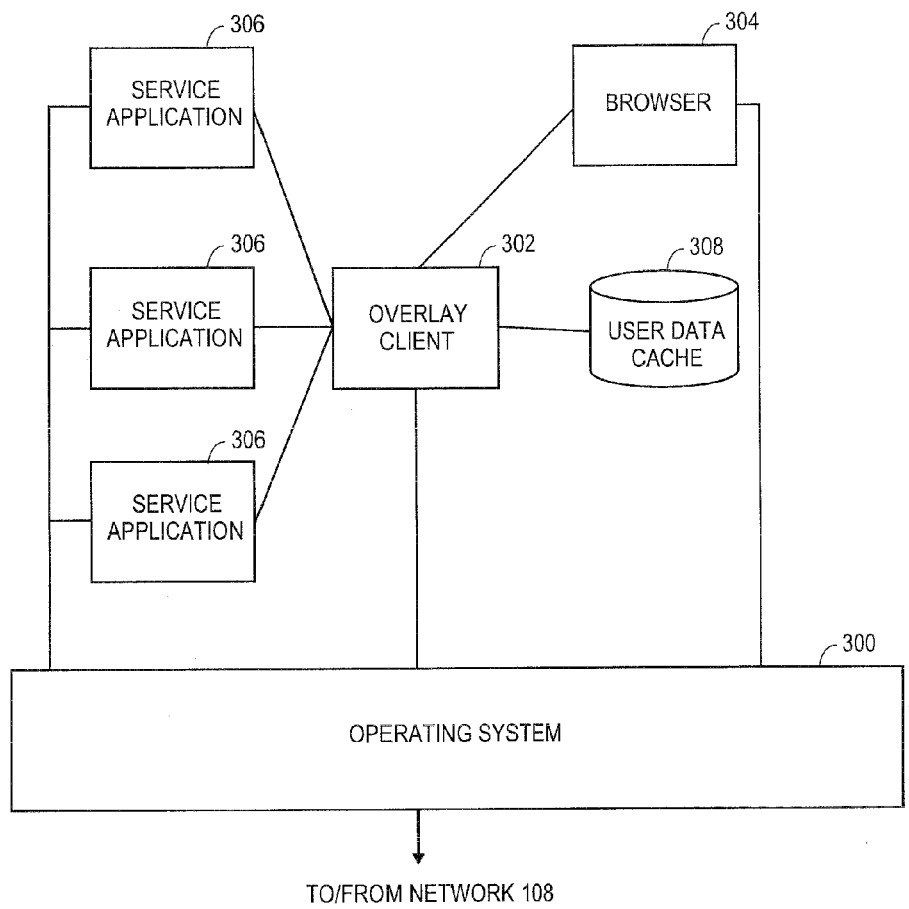
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates web documents, such as HTML pages, images, URL links, web site access times, and the like.

In order to illustrate some of the features of open overlay service 106 that provide a live social context, several examples will now be described with reference to FIGS. 4-14. FIGS. 4-14 are various screen shots of the operations and services that may be provided by open overlay service and will now be further described below. One skilled in the art will recognize that the various screen shots shown in FIGS. 4-14 are merely exemplary and that any type of web page design and architecture may be implemented in embodiments of the present invention.

FIG. 4 illustrates an exemplary home page that may be provided by open overlay service 106. The home page of open overlay service is generally intended to provide visibility of what the user and other users are doing online, enable the user to share activities in real time, and add an integrated social context to the user's online experience.

For example, web server 208 may provide the home page shown in FIG. 4. As shown, the home page may comprise a "link swarm" section, "music radar" section, and a TV party section. The link swarm section provides an indication of share activity with or by a user. The music radar section provides an indication of music preferences and play list activity. The TV party section provides an indication of link swarm and chat activity for various television shows. These sections are merely exemplary and one skilled in the art will recognize that the home page may comprise different sections. For example, the user may configure the home page to suit their own interests or social networks to include content of their own choosing. The home page may also be substituted with a home-logged in page, which are well known.

In addition, web server 208 may be configured to avoid empty pages for the users of open overlay service 106. For example, web server 208 may be configured to provide web site feeds or generate random content for pages that are empty. Application server 202 may also create random groups in order to avoid empty pages.

Figure 5:
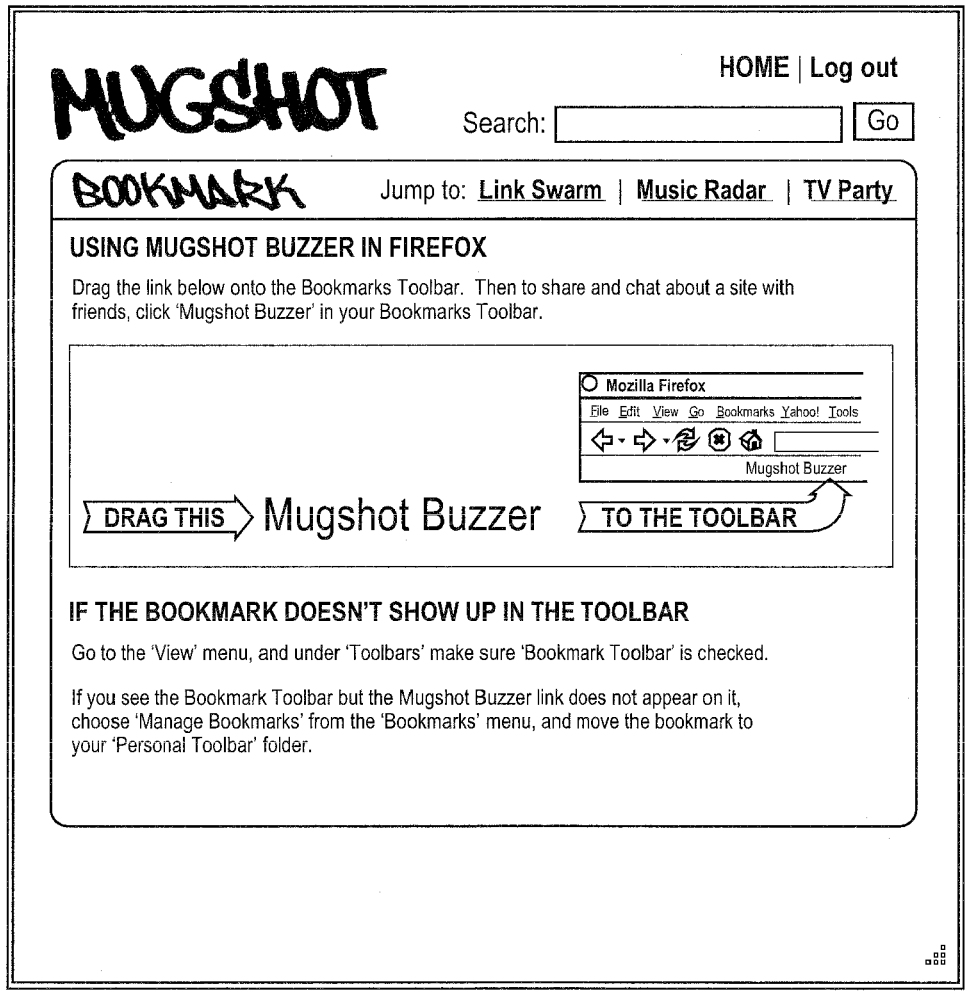
FIG. 5 illustrates an exemplary button that may be installed on a browser at a client of the open overlay service.

FIG. 5 illustrates an exemplary button that may be installed on browser 304 for open overlay service 106. For example, as shown, a "link swarm" button may be added to the toolbar of browser 304. The link swarm button allows the user to instantly share and chat about a site on network 108, such as a website, by simply clicking this button.

Figure 6:
FIG. 6 illustrates an exemplary account settings page that may be provided by the open overlay service.

FIG. 6 illustrates an exemplary account settings page that may be provided by open overlay service 106. For example, web server 208 may provide a page that allows the user to specify public information, friends only information, and security information. This information may then be stored in user database 210.

Figure 7:
FIG. 7 illustrates an exemplary friend list page that may be provided by the open overlay service.

FIG. 7 illustrates an exemplary friend list page that may be provided by open overlay service 106. For example, upon request by client 102, application server 202 may retrieve information from user database 210 and determine the friends of that user. Web server 208 may then provide information about the friends of the user in the form of the web page shown in FIG. 7.

Figure 8:
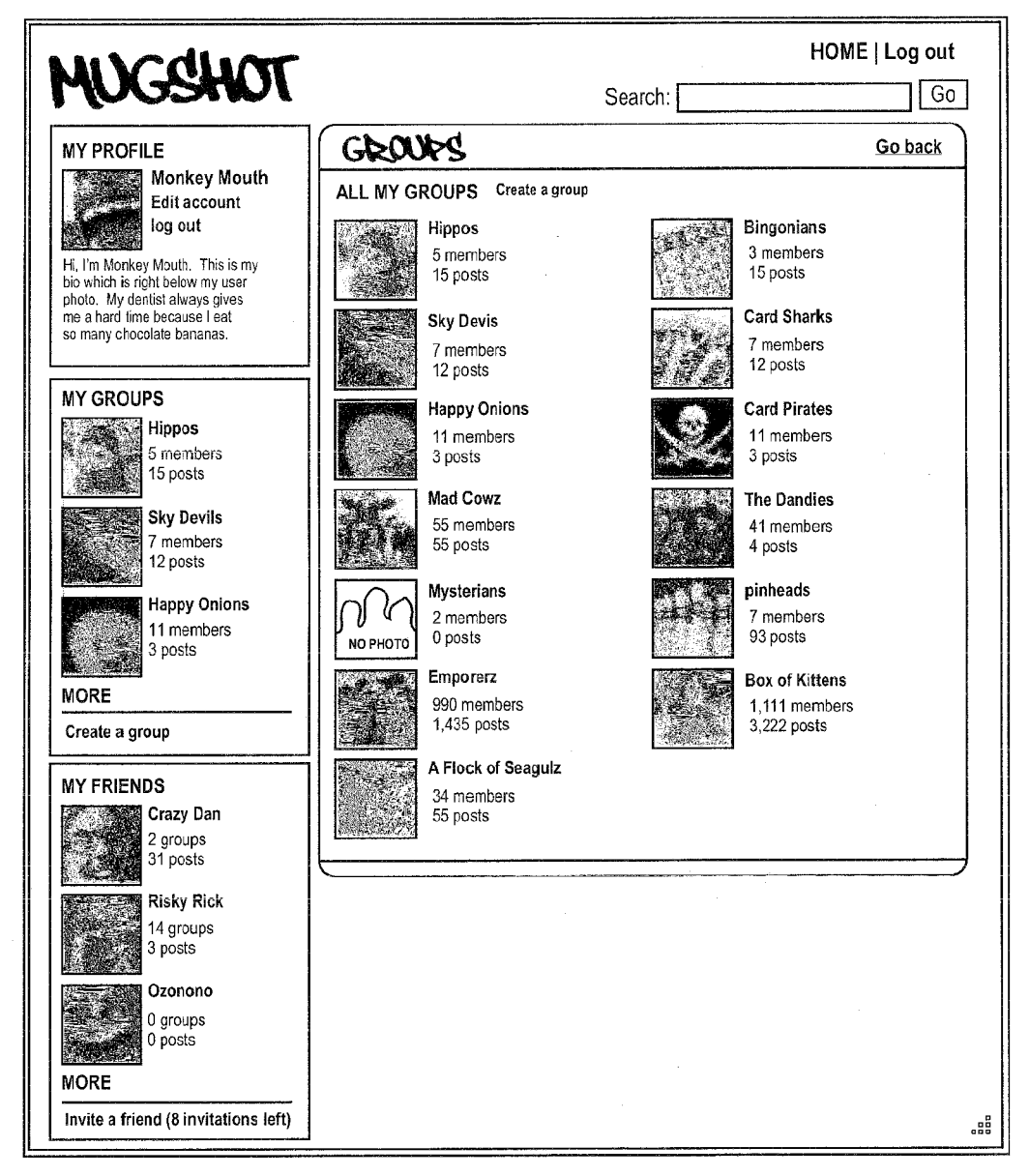

FIG. 8 illustrates an exemplary group list page that may be provided by open overlay service 106. For example, upon request by client 102, application server 202 may retrieve information from user database 210 and determine the groups of that user. Web server 208 may then provide information about the groups of the user in the form of the web page shown in FIG. 8.

Figure 9:
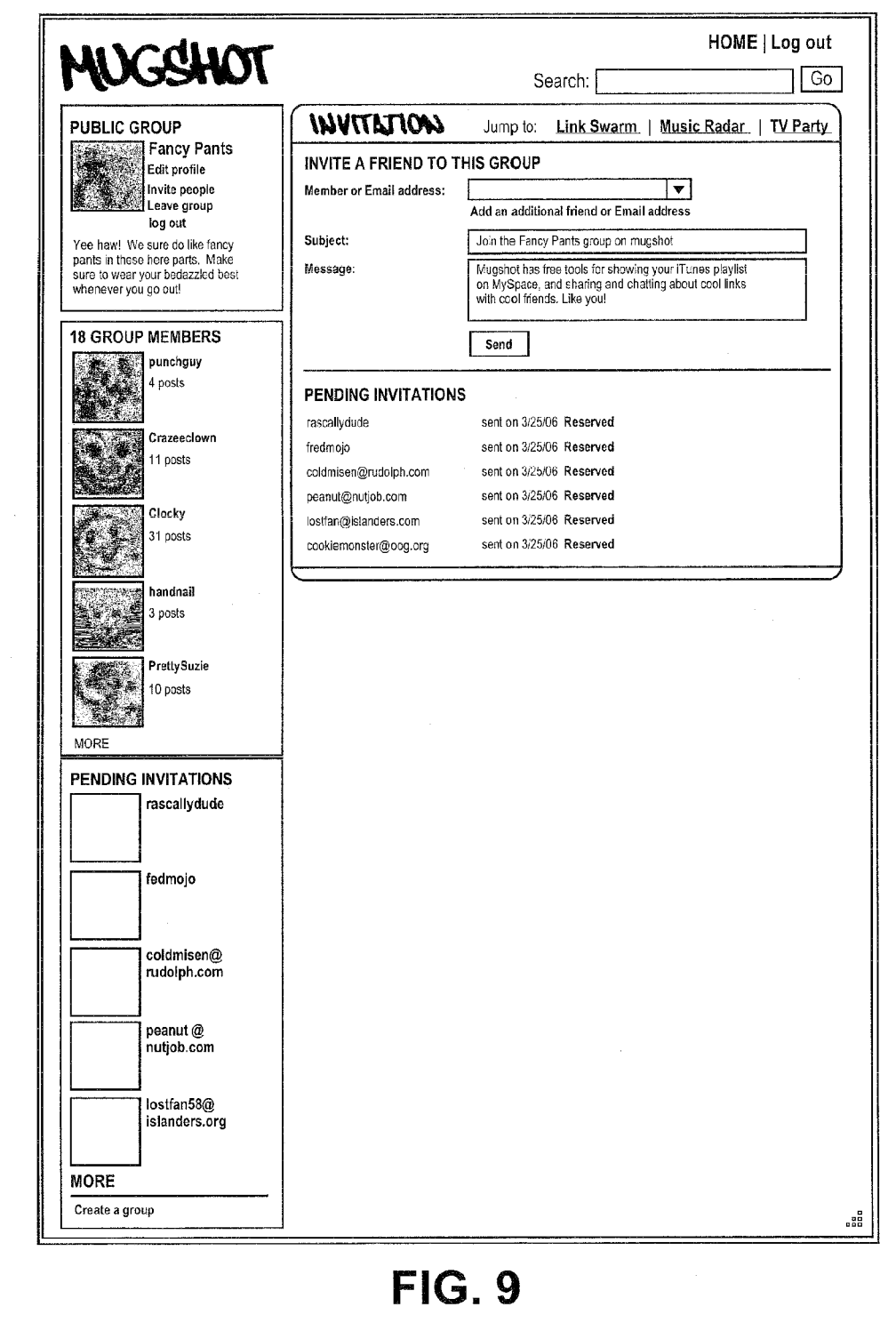

FIG. 9 illustrates an exemplary invitation form that may be provided by open overlay service 106. For example, as shown, a user at client 102 may provide basic contact information, such as an email address, and other information, such as a subject and message for use in an invitation. Web server 208 may provide this invitation form as a standard web page with entry fields. As the user enters the information, web server 208 may then pass this information to application server 202. Application server 202 may then store this information in user database 210 and send the invitation via email.

As also shown in FIG. 9, web server 208 may also provide the user a list of pending invitations. These pending invitations may have been initiated by the user or by other users in the group. The list of pending invitations may be provided by web server 208 in order to prevent redundant or conflicting multiple invitations to the same user.

In one embodiment, open overlay service 106 provides a multiple invite group feature. In one scenario for a multiple invite group, open overlay service 106 detects a new user has been invited by a user. Open overlay service 106 may then advertise this invitation to other users, such as other users that are in a group with the inviting user. Open overlay service 106 forms a temporary group of these users. Thus, when the invited user joins, open overlay service 106 notifies all the users in the temporary group.

In another scenario for a multiple invite group, open overlay service 106 detects when a new user has been invited by multiple users. Open overlay service 106 may detect redundant invitations based on the identity resource (e.g., email address) used by the inviting users and based on a time interval, such as 1 day, 1 week, 1 month, etc. In response, open overlay service 106 may create a temporary placeholder account for the invited user and a temporary group for the inviting users. Until the invited user completes their registration, the invited user is only visible to the temporary group by their temporary placeholder account. In some embodiments, this may be highlighted to the users using colors, different fonts, etc. When the invited user completes their registration with open overlay service 106, all the users in the temporary group are notified. In addition, open overlay service 106 may convert the temporary placeholder account into a permanent account that is visible to all users once the new user has completed registration. Alternatively, open overlay service 106 may require one or more conditions before allow the new user to have a permanent account. For example, open overlay service 106 may require one or more users attest to the identity of the new user. As another example, open overlay service 106 may require that a certain amount of time pass before allowing the account to become permanent. This trial or probationary period may allow the other users to determine if the new user is undesirable or ill-behaved, such as a spammer or fraudulent party.

In some embodiments, in open overlay service 106, each user will have one of three unidirectional relationships with each other user. In particular, a user may consider another user a friend, a blocked user, or a stranger. Most other users will start as strangers to each other. However, if two users interact, then open overlay service 106 will update the unidirectional relationships to blocked user or friend. For example, a user may label another user (such as a spammer) as a blocked user. Alternatively, a user may label another user as a friend. When this occurs, the user may gain visibility to contact information and public groups that the user is a member. Of course, one skilled in the art will recognize that other relationships, such as degrees of friendship, may be implemented in embodiments of the present invention.

Figure 10:
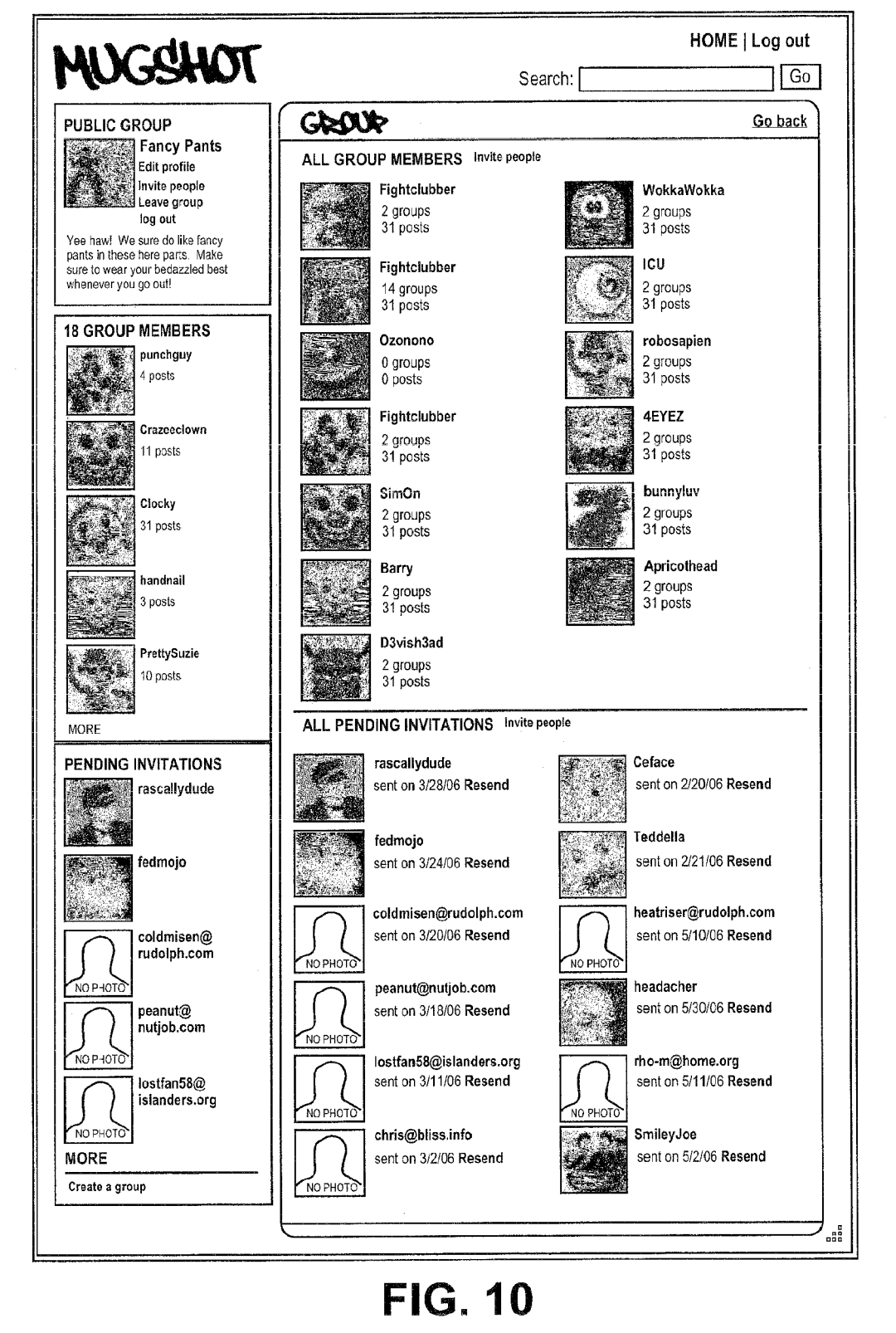

FIG. 10 illustrates another exemplary group list page that may be provided by open overlay service 106. As shown, web server 208 may update the group list page previously illustrated in FIG. 8 to indicate pending invitations to potential new users of the group.

In some embodiments, open overlay service 106 provides several types of groups. Public groups can be seen by any user, joined by any user, and posted to by any user. Friend groups may be joined by invitation only by any of the group members. However, these groups may be visible to all users and may even allow postings by non-members. Private groups are completely invisible to non-members and only members can add new users. When a group is shared with a user, that user may then become a member of the group and may receive information about posts to the group.

Figure 11:
FIG. 11 illustrates an exemplary link "swarm" enabled by the open overlay service.

FIG. 11 illustrates an exemplary link swarm enabled by open overlay service 106. As shown, a first user may initially come across a web site at service 104 that they would like to share. For example, this user may click on the link swarm button on web browser 304 shown in FIG. 5. In response, this event is detected by open overlay service 106 via web server 208. Application server 202 may then query user database 210 and determine other users that share with the first user. These other users may be explicitly identified by the first user or implicitly determined by application server 202, for example, based on the topic or group membership of the first user.

Application server 202 may then trigger messaging server 204 to send a notification to the respective client 102 of the recipient users. The notification may appear in the form of a standard dialog box or pop-up window at client 102.

As shown in FIG. 11, if the other users choose to look at the web site immediately, open overlay service 106 may also enable these users to chat with each other in real time. FIG. 13 shows an example of a link "swarm" as it may appear on client 102. This chat may be brokered through one of services 104. For example, the users may each have an account on a particular instant messaging service. Accordingly, open overlay service 106 may then trigger overlay client 302 to use the appropriate service application corresponding to this instant messaging service.

As individual users look at the web page or join the chat session, other recipients may be identified by open overlay service 106 to receive notifications that indicate the activity. Open overlay service 106 may identify these additional users based on a variety of criteria. For example, if the activity reaches a certain threshold, open overlay service 106 may select users from other groups that have common membership with the users participating in the "swarm" of activity. Users may then elect to join the activity or merely observe it.

For users who were offline during the initial share, open overlay service 106 may buffer the link, comments, and associated chats in user database 210. In some embodiments, open overlay service 106 may limit the amount of time or the number of messages that are buffered. Thus, as subsequent users come online, open overlay service 106 may provide this information to them using messaging server 204 and messaging agent 206, alone or in combination. This may allow subsequent swarms to occur as other users come online.

As a byproduct of this sharing activity, open overlay service 106 may collect a set of web pages that were shared with a user or shared by a user. Accordingly, as also shown in FIG. 11, web server 208 may also keep track of the sharing activity of the user. For example, web server 208 may provide sections on the web page in FIG. 11 that are public and indicate links shared with the user (i.e., inbound sharing activity) and links shared by the user (i.e., outbound sharing activity). Thus, the web page shown in FIG. 11 provides a rich way browsing around and allowing users to discover new groups and people. Of note, due to the open architecture of open overlay service 106, this information may be accessible to individuals even if they do not have overlay client 302 installed on their computer.

In some embodiments, for each link sharing or post, application server 202 may track which user the link was specifically sent and whether the user clicked on the link. Application server 202 may track this information, such as using a list or a history of when users joined/left groups and calculating the information.

Figure 12:
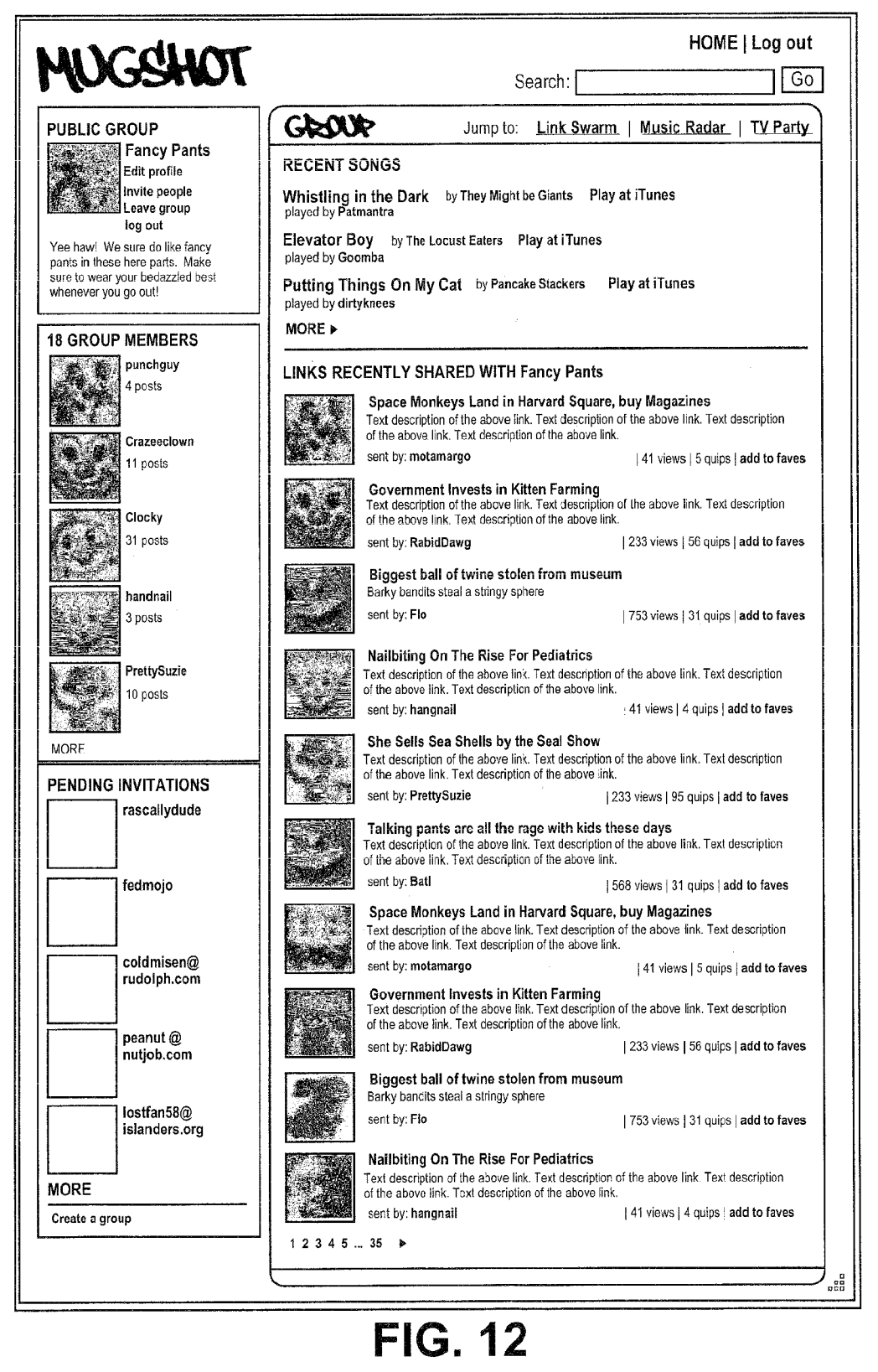

FIG. 12 shows another example of indicating share activity on the group level. In particular, as shown, links shared with a private group may be provided by web server 208 in the web page shown in FIG. 12. In addition, this web page (and others) may indicate a list of recently played songs. In particular, as songs are played on client 102, overlay client 302 may detect this activity and record certain information in user data cache 308. Overlay client 302 may then notify open overlay service 106 of the recently played songs at client 102.

Open overlay service 106 may record this information in user database 210 and also pass this information to other users via messaging server 204 and messaging agent 206. Accordingly, as shown in the web page in FIG. 12, web server 208 information about songs that users are listening to currently in addition to their recent play history. Open overlay service 106 may also provide information that indicates "favorites" of the various users. Users of open overlay service 106 may elect to have this information gathered passively by overlay client 302 as the listen to music on client 102. As noted, this play list information may be displayed by web server 208 in various places throughout open overlay service 106 and on client 102.

In some embodiments, open overlay service 106 may enable the users to acquire the actual media files from a variety of services. For example, a particular song may be available from iTunes or from Yahoo Music Engine (which are implemented on or more of services 104). For each media file, open overlay service 106 may interface with services 104 and determine the relevant information for acquiring that media file. Open overlay service 106 may then store this information in user database 210 and provide both sets of acquisition information to the users, e.g., links for both iTunes and Yahoo Music Engine.

Accordingly, if a first user, Alice, is playing a particular song purchased from iTunes, her friend, Bob, may see this activity and acquire the song using his Yahoo Music Engine service. Of course, various services may be incorporated into the open architecture of open overlay service 106, and thus, encourage user choice and flexibility.

Figure 14:
FIG. 14 illustrates an example of "music radar" for a user of the open overlay service.

FIG. 14 illustrates an example of "music radar" for the user. In particular, open overlay service 106 may provide information that indicates preferences (such as music preferences, and the like) of the users. For example, open overlay service 106 may provide a Flash embed to browser 304 that indicates the music preferences of a user in a blog, such as their MySpace blog, or other social networking services. Open overlay service 106 may passively collect this information using overlay client 302 and periodically polling overlay client 302 using messaging agent 206.

Accordingly, open overlay service 106 allows a user to indicate information about themselves across the various services 104 that they are subscribed to. Some users may find this desirable so that new users and groups who have similar interests and preferences can easily find them.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving information from a user of an open overlay service that binds a plurality of associated identity resources of the user to a unique identifier of the user;
   receiving, by a server executing the open overlay service, a request to contact the user from another user of the open overlay service based on a selected one of the plurality of associated identity resources of the user known by the another user; and
   restricting views of the another user for the identity of the user to the selected one of the plurality of associated identity resources.

2. The method of claim 1, further comprising:
   consolidating previous interactions with the plurality of associated identity resources into the unique identifier of the user.

3. The method of claim 1, further comprising:
   consolidating previous interactions with the plurality of associated identity resources into the unique identifier of the user; and
   permitting views of the another user for the identity of the user to any of the plurality of associated identity resources and the unique identifier of the user.

4. The method of claim 1, further comprising:
   updating an appearance of the plurality of associated identity resources to indicate that the plurality of associated identity resources have been bound to the unique identifier of the user.

5. The method of claim 1, further comprising:
   receiving information that indicates unidirectional relationships between the user and the another user; and
   restricting views of the another user for the identity of the user based on the unidirectional relationships.

6. The method of claim 1, further comprising:
   providing a list of people that the another user knows within the open overlay service; and
   displaying a plurality of associated identity resources for each person in the list of people.

7. The method of claim 1 wherein the associated identity resource comprises at least one of an email address, an account name, or a screen name.

8. The method of claim 1 wherein the associated identity resource comprises an identifier other than an email address.

9. A system comprising:
   a database to store identity resources of a user;
   a server coupled to the database and configured to:
      receive information from a user of an open overlay service that binds a plurality of associated identity resources of the user to a unique identifier of the user;
      receive a request to contact the user from another user of the open overlay service based on a selected one of the plurality of associated identity resources of the user known by the another user; and
      restrict views of the another user for the identity of the user to the selected one of the plurality of associated identity resources.

10. The system of claim 9, wherein the server is further configured to:
    consolidate previous interactions with the plurality of associated identity resources into the unique identifier of the user.

11. The system of claim 9, wherein the server is further configured to:
    consolidate previous interactions with the plurality of associated identity resources into the unique identifier of the user; and permit views of the another user for the identity of the user to any of the plurality of associated identity resources and the unique identifier of the user.

12. The system of claim 9, wherein the server is further configured to:
   update an appearance of the plurality of associated identity resources to indicate that the plurality of associated identity resources have been bound to the unique identifier of the user.

13. The system of claim 9, wherein the server is further configured to:
   receive information that indicates unidirectional relationships between the user and the another user; and
   restrict views of the another user for the identity of the user based on the unidirectional relationships.

14. The system of claim 9, wherein the server is further configured to:
   provide a list of people that the another user knows within the open overlay service; and
   display a plurality of associated identity resources for each person in the list of people.

15. A non-transitory machine readable storage medium including components that, when executed by a server, cause the server to perform operations comprising:
   receiving information from a user of an open overlay service that binds a plurality of associated identity resources of the user to a unique identifier of the user;
   receiving, by the server executing the open overlay service, a request to contact the user from another user of the open overlay service based on a selected one of the plurality of associated identity resources of the user known by the another user; and
   restricting views of the another user for the identity of the user to the selected one of the plurality of associated identity resources.

16. The non-transitory computer readable storage medium of claim 15, wherein the operations further comprise:
   consolidating previous interactions with the plurality of associated identity resources into the unique identifier of the user.

17. The non-transitory computer readable storage medium of claim 15, wherein the operations further comprise:
   consolidating previous interactions with the plurality of associated identity resources into the unique identifier of the user; and
   permitting views of the another user for the identity of the user to any of the plurality of associated identity resources and the unique identifier of the user.

18. The non-transitory computer readable storage medium of claim 15, wherein the operations further comprise:
   updating an appearance of the plurality of associated identity resources to indicate that the plurality of associated identity resources have been bound to the unique identifier of the user.

19. The non-transitory computer readable storage medium of claim 15, wherein the operations further comprise:
   receiving information that indicates unidirectional relationships between the user and the another user; and
   restricting views of the another user for the identity of the user based on the unidirectional relationships.

20. The non-transitory computer readable storage medium of claim 15, wherein the operations further comprise:
   providing a list of people that the another user knows within the open overlay service; and
   displaying a plurality of associated identity resources for each person in the list of people.

* * * * *